April 19, 1966 D. B. PALL 3,246,920
COUPLER FOR FILTER ELEMENTS

Filed March 15, 1963 2 Sheets-Sheet 1

United States Patent Office 3,246,920
Patented Apr. 19, 1966

3,246,920
COUPLER FOR FILTER ELEMENTS
David B. Pall, Roslyn Estates, N.Y., assignor to Pall Corporation, Glen Cove, N.Y., a corporation of New York
Filed Mar. 15, 1963, Ser. No. 265,487
4 Claims. (Cl. 285—237)

This invention relates to a coupler for detachably connecting sections of fluid conduit, such as sectional filter elements.

Filter units are made in a variety of sizes, shapes and flow capacities, according to the particular use for which they are intended. Generally, each filter element must be specifically made to fit the particular filter unit, and can only be replaced with an identical one. Maintaining adequate supplies of each of a variety of filter elements can be a problem where different types of filter units are used.

In previous arrays of filter elements built from sectional ones, the filter unit housing has included various guiding, retaining and attaching means such as guide rails, center support rods, clamps, and nuts and bolts to hold the array in position. Careful fabrication and manipulation of parts is thus necessary to fit, assemble and to take apart such sectional filters. It is usually not possible to replace individual sectional filter elements in the array without disassembling the entire array.

This invention provides a coupler, capable of linking conventional filter elements and other types of fluid conduits of any dimensions by a simple press fit. The coupler comprises an annular body member having an upper and a lower face, a plurality of gripping members projecting from each face, and gripping means associated therewith for engagement with end portions of the fluid conduits, such as end caps of filter elements, to couple such portions against each face, and thus to each other through the coupler. The gripping members and means are of dimensions to hold the end portions against the faces of the coupler body member in a manner to form a fluid-tight seal. The annular passage of the body member is aligned by the gripping members with the central openings in the end caps of the coupled fluid conduits, for passage of fluid therebetween.

The cross-sectional configuration of the body member is closed, and for ease of sealing against leakage is preferably congruent with that of the end portions of the fluid conduits to which it is coupled. Such closed cross-sectional configurations can be symmetrical or asymmetrical, such as for instance, circular, oval, elliptical, polygonal, such as star-shaped, square, rectangular, and triangular, and the sides thereof may be straight or curved.

The gripping members are preferably at least three in number, spaced opposedly and evenly with respect to each other, and are sufficiently resilient to permit radial displacement thereof for engagement and disengagement of the gripping means with the end portions. Resiliency can be obtained by use of resilient materials, and by appropriate dimensioning of the members to avoid rigidity. The members can take any of a variety of configurations, such as legs, lugs, arcuate walls extending over a substantial arc of the annular opening of the body member, or a slitted tubular extension of the body member.

The gripping means can be formed by a configuration on a side or top of the member adapted to engage a corresponding end portion of the fluid conduit to which the coupler is connected. The gripping means can therefore be a depressed portion, such as a recess, groove, or slot, or a raised portion, such as a lip, ridge, or dimple, on the side or top of the member, matched to engage, for example, a corresponding raised portion or depressed portion on the end portion of the fluid conduit.

In a preferred embodiment of this invention, the two faces of the body member are perpendicular to the axis through the annular opening, and face in opposite directions. Three or more legs opposedly and evenly spaced about said annular opening project from the inner periphery of the annular body member, axially beyond both faces. The legs are designed to enter the central opening of an end portion. The gripping means are in the form of a lip or ridge projecting outwardly from the legs, the external edge thereof being inclined at an angle of 45° or less to the axis, and the inner edge thereof being inclined at an angle of from 60 to 90° to the axis, in order to facilitate the radial displacement of the gripping means and leg when the coupler is press-fitted into the end portion of a fluid conduit. The legs of the coupler are displaced inwardly when the external edge of the gripping means bears on the periphery of the central opening in the end portion, and slide thereover until the end of the gripping means is reached, when the legs snap outwardly to their normal position relative to the body member, and into fixed engagement therewith. The gripping means are so positioned on the legs in relation to each face of the body member that, when they snap into fixed engagement with the end portion of the fluid conduit, a fluid-tight seal is formed between that face of the coupler and the end portion of the fluid conduit.

The coupler of this invention can be made of any suitable material which is substantially non-reactive with and insoluble in the liquid to be used in the fluid system, and which has sufficient rigidity to retain the coupled fluid conduits or filter elements in fluid-tight relationship. It can be of a unitary cast or molded construction. A wide variety of materials can be used, such as metals, synthetic resinous polymers, or cellulose derivatives. Aluminum, stainless steel, and like stainless alloys, rubber, fluorocarbon rubber, butyl rubber, acrylonitrile rubber, polytetrafluoroethylene, polyethylene, polypropylene, polyoxymethylene, polyvinyl chloride, neoprene, cellulose acetate and similar materials are exemplary.

The coupler of this invention can be used to connect any commerically available fluid conduits, having end portions of suitable configuration to retain the gripping means, such as conventional cylindrical sectional filter elements. The end portions of such filter elements have end caps, made of sheet material, usually metal or plastic, and having a fluid opening communicating with the interior portion of the filter. The gripping members or legs on the coupler can be pushed into the central opening of the end cap, until the gripping means thereof engages with the edge or inner surface of the end cap. To provide a guiding or bearing surface for the gripping members, the end cap can be turned axially inward or outward at its fluid opening to define a fluid passage. The inner ends of the walls of this passage can be flanged, to avoid a sharp edge that would in time wear off the gripping means. In such a case the sides of the members can bear against the walls of the passage, resulting in a more rigid vibration-tight coupling, and the gripping means snap over the end-flange.

The end caps can be constructed of any conventionally used material which is substantially non-reactive with and insoluble in the liquid to be used in the fluid system. Metals and metal alloys such as aluminum and stainless steel are preferred. However, any of the ceramic materials, synthetic polymers and cellulose derivatives mentioned above as suitable for the coupler can be used.

The end portions of fluid conduits can also have other attaching means, matched to the gripping means of the coupler, for positive engagement therewith. Such attaching means can be an elevation or depression on the end portion of the fluid conduit, matched to an indentation or projection forming the gripping means on the side or top of the gripping members. Thus, for instance, sections of pipe to be coupled in accordance with this invention can be provided with recesses, grooves, slots, dimples, lips, or ridges on their inner or outer surfaces, for reception of the gripping means of the coupler.

In each instance, whenever the gripping means of the coupler engages the corresponding attaching means of the fluid conduit, one face of the coupler bears against at least a part of the end portion of the fluid conduit or a gasket or sealing ring therebetween to form a fluid-tight seal therewith.

The coupler of this invention makes it possible to construct filters of varying sizes, filter surface area, and flow capacities by coupling together two or more standardized sectional filter elements to form arrays of any desired length. One or more such arrays can be used to make a wide variety of filters. This invention thus permits the standardization of parts.

The coupler of this invention provides for easy and rapid engagement by a press fit and detachment by a pull of composites of sectional elements, a simple, effective, and inexpensive coupling thereof. There is no need for guiding and retaining structures in the filter unit, nor are manual adjustments required. The coupler is self-locking, and is unlikely to damage brittle parts. In fact, the coupler of this invention by appropriate selection of material and shape can be designed to cushion the ceramic and sintered materials from which many filter elements are made, and protect them from abrading contact with each other and other parts of the filter unit, thus reducing wear or damage. Maintenance and cleaning of filter units is greatly facilitated, since the filter is made up of a number of smaller sectional filter elements instead of one large, cumbersome, and expensive one. Furthermore, one or more sectional filter elements can be individually replaced without disassembling or replacing the entire filter.

The coupler of this invention can also be used to connect sections of fluid conduit other than sectional filter elements. Sections of pipe and other types of tubular channels, such as wave-guides, can be connected by use of this coupler.

Figure 1:
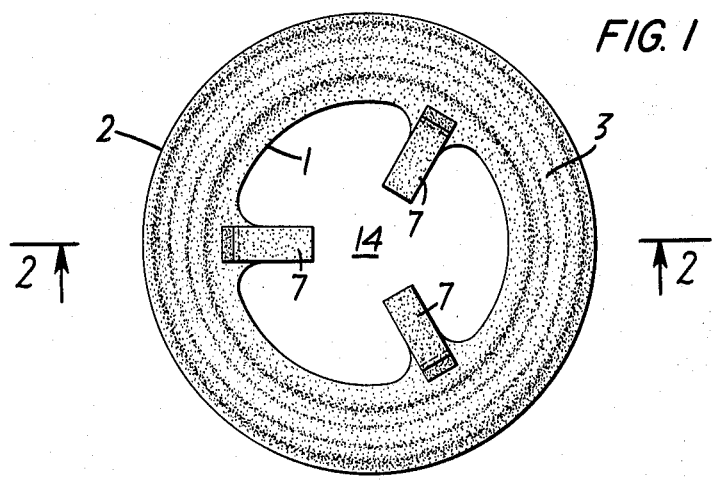
FIGURE 1 is a plan top view of a preferred embodiment of a coupler in accordance with this invention.
Figure 2:
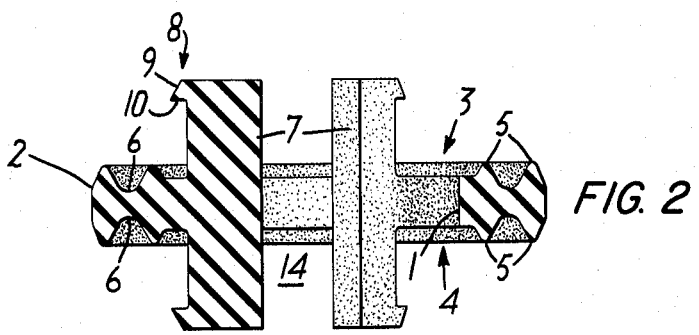
FIGURE 2 is a sectional view, taken along the line A—A in FIGURE 1, and looking in the direction of the arrows.
Figure 3:
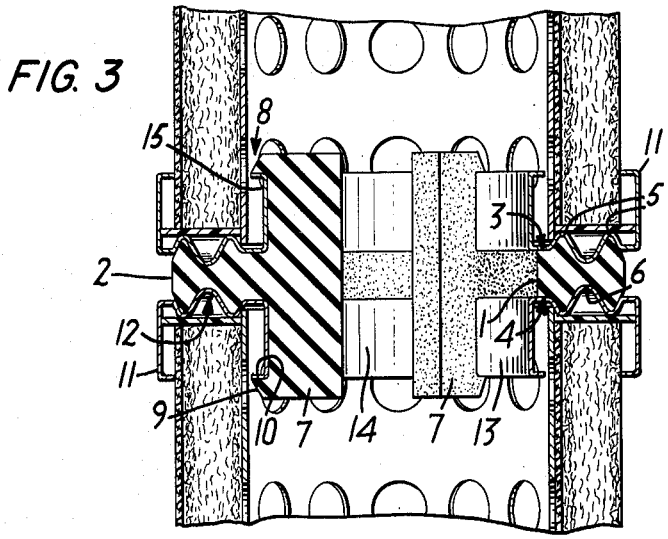
FIGURE 3 is a view partly in section of the end cap of a filter element coupled with the coupler of FIGURES 1 and 2.

FIGURES 1 through 3 show a preferred embodiment of this invention. In this embodiment, the coupler is molded in one piece of resilient Buna-N, an acrylonitrile rubber, and has an annular body member 2. The diameter of the body member is about 1¾ times the diameter of its central passage 14, and the maximum thickness of the body member, measured along the axis of its central opening, is about ⅓ its radius. The oppositely facing surfaces 3 and 4 constitute the upper and lower faces of the body member. These faces are each provided with two spaced ridges 5, each having an apex of approximately 60° and a furrow 6 therebetween, all concentric to the central annular opening.

At spaced intervals along the inner periphery 1 of said annular body member 2, three gripping members in the form of legs 7 extend radially inward and project axially beyond both faces 3 and 4. The length of the legs is about ⅓ the radius of the central annulus. Each leg has, integral therewith, a gripping means 8 in the form of a lip extending radially outward (about 0.02 radius) from the ends of the legs. The external edge 9 of the lip is inclined outwardly from the end of the legs at an angle of about 35° with the axis. The inner edge 10 of the lip 9 forms the gripping surface, and is at an angle of 90° to the axis, thus forming a ledge which faces the body member and can engage the inner surface of the end cap of a filter element as shown in FIGURE 3.

The end cap 11 of the cylindrical sectional filter element of FIGURE 3 is die-stamped from sheet steel. It has a concentrically grooved sealing surface 12 the grooves of which are matched for sealing engagement with the ridges 5 and furrow 6 of the corresponding face 3 or 4 of the coupler. There is a fluid opening 13 in the end cap communicating with the interior portion of the filter element. The inner periphery of the cap at the opening 13 is turned inwardly forming a flange 15. The diameter of the opening 13 is the same as that of the central opening 14 of the coupler and is coaxial therewith.

In assembling the composite of FIGURE 3 the coupler is inserted in the opening 13. The external edges 9 of the gripping means encounter the flange 15 and force the legs 7 inwardly whereupon the legs slip easily over the flange due to the angle of the surface. When the inner edge 10 of the gripping means is reached the legs 7 can return to their normal position, and the gripping means 8 snap over flange 15. The distance from the inner face 10 of the lips 8 to the face 3 of the coupler is such that the legs hold the coupler against the end cap in a leakproof seal. The coupler is of resilient material, and acts like a gasket. A similar seal is formed with the other coupled filter element, and so in this manner, the sectional filter element of FIGURE 3 can be firmly coupled to a second similar sectional filter element, using the remaining set of legs 7 on the other side of the coupler. The coupler may be withdrawn from the filter element by a sharp pull applied to the two filter elements or to one element and the coupler. Thereupon the lip 10 is forced over flange 15 and the coupler can be removed.

It should be noted that the ridges on the faces of the coupler will form a fluid-tight seal even with an end cap having a flat sealing surface. Thus, any type of end cap available on conventional sectional filter elements can serve as a coupling base for the coupler of this invention.

Figure 4:
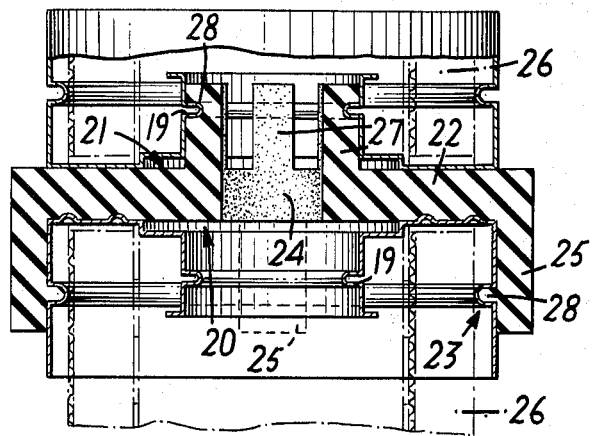
FIGURE 4 shows the end caps of two filter elements held in sealing engagement with each other by means of another embodiment of a coupler in accordance with this invention.

FIGURE 4 shows two filter elements coupled to each other by means of another embodiment of coupler in accordance with this invention. In this embodiment, the annular body member 22 has a central opening 24 and four legs 27 extending axially in one direction from the inner periphery 21 of the body member, and four legs 25 extending axially in the opposite direction from the outer periphery 20 of the body member. The legs 27 carry gripping means 28 in the form of an outer groove matching attaching means 19 in the form of a ridge about the inside of the fluid passage 24 in the end portion of the filter element 26. The legs 25 carry gripping means 28 in the form of an inner ridge matched to attaching means 23 in the form of a groove about the end portion of the filter element 26.

Figure 5:
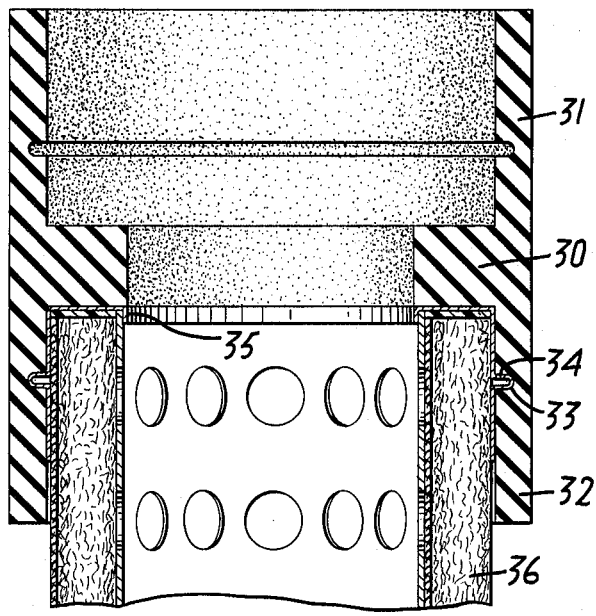
FIGURE 5 shows a different embodiment of a coupler in accordance with this invention, coupled with the end cap of a filter element.

FIGURE 5 shows another embodiment of coupler of this invention which is particularly adapted for coupling cylindrical filter elements of relatively small diameter. In this embodiment the coupler has an annular body member 30. From the outer periphery of the body member two opposed arcuate members 31, 32 conforming in curvature to the element extend axially in opposite directions. Gripping means are provided in the form of an annular groove 33 cut into the inside surface of each arcuate member. An attaching means is provided in the form of an annular ridge or bead 34 disposed about the exterior surface of the end cap 35 of the filter element 36.

It will be apparent from the above description and drawings that various modifications of couplers and filter elements or fluid conduits as shown and described in FIGURES 1 to 5 can be made. For instance, the number and type of gripping members extending beyond their respective faces may be varied. One, two, three, four, or more independent members may be provided, extending in each direction from the body member. It is not necessary that the same number of gripping members extend in each direction. Neither is it necessary that members extending in different directions be aligned with each other. They can be staggered or otherwise spaced, in accordance with convenience, or with the configuration of the end portion of the fluid conduit to which the coupler is to be attached. To meet particular requirements it is possible, for instance, to mold unitary couplers in such a manner that a thin, flexible membrane connects the various independent gripping members. For added strength and increased resistance against radial displacement, the members may be extended radially inward to meet in the central portion of the coupler, approximately in the plane of the body member, without unduly constricting the annular opening therethrough.

Further equivalent modifications of the coupler and filter elements or fluid conduits of this invention will be apparent to those skilled in the art.

I claim:
1. A coupled fluid flow assembly having a fluid inlet and a fluid outlet and comprising, in combination, at least two hollow cylindrical elements each having at least one open end, an end cap on each open end, the end caps having a fluid opening therethrough, and a unitary coupler detachably connecting the cylindrical elements end-to-end to form the assembly; and having an annular body member, sealing surfaces on upper and lower faces thereof and a passage therethrough, a plurality of gripping members in the form of resilient legs projecting axially outward at spaced intervals around the inner periphery of each face of the body member and extending axially into the fluid opening of each end cap, said resilient legs being displaceable radially inwardly and having at their outer edges gripping means engaging the inner end of the periphery of the said fluid opening for aligning the passage with the fluid opening, the gripping means comprising a lip projecting radially outwardly from the end of the legs, the external edge thereof being inclined at an angle of at most 45° to the axis of the coupler and the inner edge thereof being inclined at an angle of from 60 to 90° to the axis of the coupler, the legs being dimensioned to hold each of the end caps against the sealing surface of the body member in a fluid-tight seal.

2. A coupled fluid flow assembly in accordance with claim 1 wherein the sealing surfaces and the ends caps have concentric raised and depressed portions formed thereon, the raised portions being in fluid-tight sealing contact with the depressed portions thereof.

3. The coupled fluid flow assembly of claim 1 wherein the cylindrical element is a filter cylinder having two open ends and end caps on each end.

4. The coupled fluid flow assembly of claim 3 wherein the filter is corrugated.

References Cited by the Examiner

UNITED STATES PATENTS

| | | | |
|---|---|---|---|
| 1,051,427 | 1/1913 | McCluskey | 285—397 X |
| 1,210,885 | 1/1917 | Beall | 61—11 |
| 1,811,277 | 6/1931 | Mosley | 285—237 |
| 1,906,826 | 5/1933 | Smith | 285—354 X |
| 2,029,920 | 2/1936 | Gutman | 61—10 |
| 2,116,165 | 5/1938 | Ullman | 61—10 |
| 2,123,889 | 7/1938 | Gleason | 285—371 |
| 2,182,995 | 12/1939 | Pepper | 285—371 |
| 2,313,307 | 3/1943 | Wilkinson | 285—345 |
| 2,517,290 | 8/1950 | De Moude. | |
| 2,561,884 | 7/1951 | Perrow | 277—207 |
| 2,847,240 | 8/1958 | Stone. | |
| 2,871,034 | 1/1959 | Wiltse | 285—235 X |
| 3,054,266 | 9/1962 | Esch | 61—11 |

FOREIGN PATENTS

| | | |
|---|---|---|
| 545,625 | 3/1956 | Belgium. |
| 917,407 | 2/1963 | Great Britain. |

CARL W. TOMLIN, *Primary Examiner.*